(12) United States Patent
Bosset et al.

(10) Patent No.: US 8,994,853 B2
(45) Date of Patent: Mar. 31, 2015

(54) METHOD FOR CONTROLLING A LIGHT-SENSITIVE DEVICE

(75) Inventors: Bruno Bosset, Coublevie (FR); Gauthier Creteur, Entre Deux Guiers (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 35 days.

(21) Appl. No.: 13/501,055

(22) PCT Filed: Oct. 11, 2010

(86) PCT No.: PCT/EP2010/006187
§ 371 (c)(1),
(2), (4) Date: Aug. 21, 2012

(87) PCT Pub. No.: WO2011/042204
PCT Pub. Date: Apr. 14, 2011

(65) Prior Publication Data
US 2012/0314112 A1    Dec. 13, 2012

(30) Foreign Application Priority Data

Oct. 9, 2009  (FR) .................................... 09 04847

(51) Int. Cl.
*H04N 5/217* (2011.01)
*H04N 5/357* (2011.01)
(Continued)

(52) U.S. Cl.
CPC ............... *H04N 5/335* (2013.01); *H04N 5/357* (2013.01); *H04N 5/21* (2013.01); *H04N 5/217* (2013.01)
USPC ....................... 348/241; 348/230.1; 348/229.1

(58) Field of Classification Search
None
See application file for complete search history.

(56) References Cited

U.S. PATENT DOCUMENTS

| 4,945,420 A | 7/1990 | Berger et al. |
| 5,276,508 A | 1/1994 | Boisvert et al. |

(Continued)

FOREIGN PATENT DOCUMENTS

| CN | 101305397 A | 11/2008 |
| CN | 101388668 A | 3/2009 |

(Continued)

OTHER PUBLICATIONS

Office Action for Chinese Patent Application No. 201080054461.7, dated Aug. 5, 2014.

(Continued)

*Primary Examiner* — Twyler Haskins
*Assistant Examiner* — Angel L Garces-Rivera
(74) *Attorney, Agent, or Firm* — Baker & Hostetler LLP

(57) ABSTRACT

The invention relates to a method for controlling a light-sensitive device comprising a matrix of light-sensitive points arranged into lines and columns. The invention can essentially but not exclusively be used in light-sensitive devices used for detecting X-ray images. The method includes a step ($E_2$) of acquiring an image during which each light-sensitive point can accumulate a charge, and a step ($E_3$) of reading said image. The reading step ($E_3$) comprises a preliminary sub-step ($E_{31}$) of converting the charges accumulated at the different light-sensitive points into analog signals representative of said charges, and a sub-step ($E_{32}$) of processing the analog signals in order to obtain a digital image. According to the invention, the processing sub-step ($E_{32}$) is repeated N times for a same light-sensitive point and for a same acquisition step ($E_2$), with N being an integer greater than or equal to two, and the reading step ($E_3$) comprises a sub-step ($E_{35}$) of averaging the N signals processed per light-sensitive points in order to provide a single digital image per acquisition step ($E_2$).

10 Claims, 6 Drawing Sheets

(51) Int. Cl.
*H04N 5/21* (2006.01)
*H04N 5/335* (2011.01)

(56) References Cited

U.S. PATENT DOCUMENTS

| | | | |
|---|---|---|---|
| 5,946,033 | A | 8/1999 | Mooney et al. |
| 6,686,959 | B1 | 2/2004 | Ducourant |
| 6,885,397 | B1 | 4/2005 | Ducourant |
| 7,054,474 | B1 * | 5/2006 | Krieger ............... 382/128 |
| 2005/0184243 | A1 * | 8/2005 | Endo .................. 250/369 |
| 2006/0197857 | A1 * | 9/2006 | Barna et al. .......... 348/308 |
| 2008/0122962 | A1 * | 5/2008 | Shah ................... 348/308 |

FOREIGN PATENT DOCUMENTS

| | | |
|---|---|---|
| EP | 0323924 A1 | 7/1989 |
| EP | 0748113 A2 | 12/1996 |
| EP | 1874040 A2 | 1/2008 |
| FR | 2605166 A1 | 4/1988 |
| FR | 2625593 A1 | 7/1989 |
| FR | 2760585 A1 | 9/1998 |
| FR | 2772161 A1 | 6/1999 |
| JP | S6386976 A | 4/1988 |
| JP | 2008011284 A | 1/2008 |
| JP | 2008124527 A | 5/2008 |
| JP | 2008149168 A | 7/2008 |
| JP | 2009296423 A | 12/2009 |

OTHER PUBLICATIONS

Office Action for Japanese Patent Application No. 2012-532495, dated Jun. 6, 2014.

* cited by examiner

METHOD FOR CONTROLLING A LIGHT-SENSITIVE DEVICE

CROSS-REFERENCE TO RELATED APPLICATIONS

This application is a National Stage of International patent application PCT/EP2010/006187, filed on Oct. 11, 2010, which claims priority to foreign French patent application No. FR 0904847, filed on Oct. 9, 2009, the disclosures of which are incorporated by reference in their entirety.

FIELD OF THE INVENTION

The present invention relates to a method of controlling a photosensitive device comprising a matrix of photosensitive points which are produced for example by techniques for depositing semi-conducting materials. It applies essentially, but not exclusively, to photosensitive devices used for the detection of radiological images.

BACKGROUND

Technologies using semi-conducting materials such as for example:
  hydrogenated amorphous silicon (aSiH), on insulating glass supports,
  CMOS on crystalline silicon substrate,
  charge-coupled circuits (CCD) on crystalline silicon substrate,
make it possible to produce matrices of photosensitive points that are able to produce an image on the basis of visible or near-visible radiation. These matrices can nonetheless be used within the framework of the detection of radiological images. Accordingly, it suffices to interpose a scintillator screen between the X-ray radiation and the matrix so as to convert the X-ray radiation into luminous radiation in the band of wavelengths to which the photosensitive points are sensitive. The X-rays can also be converted directly into electrical charge by virtue of a photoconducting material (e.g.: a-Se, CdTe, PbO, PbI2, etc.). In this case, the photosensitive points each comprise a charge storage capacitor.

The photosensitive points which form these matrices generally comprise a photosensitive element associated with an element fulfilling an on/off switch function. The photosensitive point is mounted between a row conductor and a column conductor. According to requirements, the photosensitive device then comprises a plurality of photosensitive points disposed as a matrix or strip.

The photosensitive element commonly consists of a diode, mounted in series with the on/off switch element. The on/off switch element may be for example a so-called switching diode whose "passing" or "on" state corresponds to the bias which turns it on in the forward direction, and whose "blocked" or "off" state corresponds to the reverse bias thereof. The two diodes are mounted with opposite directions of conduction, in a so-called "head-to-tail" configuration. Such an arrangement is well known, notably from French patent application 86 14058 (Publication No. 2 605 166) in which are described a matrix of photosensitive points of the type with two diodes in "head-to-tail" configuration, a method for reading the photosensitive points and a way of producing a photosensitive device such as this.

The column conductors are linked to a reading circuit converting the charge accumulated in the photosensitive elements into signals and delivering these signals as output. More particularly, the reading circuit can comprise several stages. Among these stages, a first stage can convert the charge into analog signals; a second stage can amplify these signals; a third stage can multiplex the signals so as to deliver "in series" and row after row as output from the reading circuit, a multiplexed signal comprising the signals representative of the charge accumulated in the photosensitive elements; and a fourth stage can convert the analog multiplexed signal into a digital signal. Like any electronic device, the reading circuit introduces electronic noise that gets added to the signals representative of the accumulated charge and limits the signal-to-noise ratio. In this instance, noise is generated at each stage of the reading circuit, and possibly further on in the image acquisition chain. More generally, noise is introduced at each modification or transformation of an analog signal, until this signal is converted into a digital signal. The noise is particularly troublesome insofar as the signals arising from the first stage may have a very small amplitude for certain modes of image acquisition, in particular when the X-ray radiation exposure time is small. The signal-to-noise ratio is then very small, for example close to unity, and the so-called useful signal, that is to say that representative of the charge accumulated in the photosensitive elements, may be difficult to extract from the overall signal, that is to say from the signal comprising at one and the same time the useful signal and the noise.

The generation of noise by the image acquisition chain may be limited by the design of the photosensitive device. However, noise generation depends greatly on the mode of use of the photosensitive device, notably the time for which the photosensitive points are exposed, the speed of reading the charge and the amplification gain applied to the signals. Thus, during the design of the photosensitive device, a compromise must be made between the various possible modes of use.

A solution for decreasing the noise generated during the transfer of the charge accumulated in the various photosensitive points to a charge amplifier is known from the French patent application published under the number FR 2 625 593. This patent describes a method for reading passive photosensitive points where the following is performed N times successively: a transfer of the charge present on each column of the matrix to intermediate storage zones, a duplication of this charge, a column-wise averaging of the duplicated charge and a restoral to the columns of the original charge. The charge averages are thereafter transferred to the following stage. The noise introduced during each transfer to the intermediate storage zones is generally decorrelated from the other noise. The averaging therefore makes it possible to partially cancel said noise. However, though the solution described in this patent does indeed make it possible to globally reduce the noise introduced by the image acquisition chain, it is solely at the level of the transfer of charge between the photosensitive points and the charge amplifier. The noise introduced at all the other stages of the image acquisition chain is not reduced. Moreover, the solution described in this patent applies only to the reading of passive photosensitive points, that is to say photosensitive points where the charge is converted into voltages in the reading circuit and not directly in the photosensitive points, as is the case for active photosensitive points.

SUMMARY OF THE INVENTION

An aim of the invention is notably to alleviate all or some of the aforementioned drawbacks. For this purpose, the subject of the invention is a method of controlling a photosensitive device comprising a matrix of photosensitive points organized in rows and columns, the method comprising a step of acquiring an image in the course of which each photosensitive point is able to accumulate a charge and a step of reading this image, the reading step comprising a prior sub-step of converting the charge accumulated at the various photosensitive points into analog signals representative of this charge and a sub-step of processing these analog signals with a view to obtaining a digital image, the method being characterized in that the processing sub-step is repeated N times for one and the same photosensitive point and for one and the same acquisition step with N an integer greater than or equal to two, and in that the reading step comprises a sub-step of averaging the N signals processed per photosensitive point so as to provide a single digital image per acquisition step.

According to a particular embodiment, the analog signals are voltages.

The processing sub-step can comprise:
a conversion of the analog signals into digital signals;
a multiplexing of the analog signals;
a sampling/holding of the analog signals immediately preceding their multiplexing;
an amplification of the analog signals or, if appropriate, of the digital signals.

According to a particular embodiment, each step of acquiring an image for which the photosensitive points are subjected to an exposure, called the useful image, is preceded by a step of acquiring an image for which the photosensitive points are not subjected to an exposure, called the offset image, and by a step of reading this offset image, the step of reading the offset image being identical to the step of reading the useful image, the useful image being corrected as a function of the offset image.

In a first variant, the processing sub-step is repeated N times for one and the same row before considering the next row.

In a second variant, the processing sub-step considers each row in succession before being repeated.

According to a first embodiment, the analog signals representative of the charge of all the photosensitive points are reset to zero after the N repetitions for each photosensitive point of the processing sub-step.

According to a second embodiment, the analog signals representative of the charge of all the photosensitive points of the row considered are reset to zero before considering the next row.

The advantage of the invention is notably that it makes it possible to decrease the noise generated over almost the entire image acquisition chain. In particular, the noise generated as soon as the charge is converted into analog signals may be reduced.

BRIEF DESCRIPTION OF THE DRAWINGS

The invention will be better understood and other advantages will become apparent on reading the detailed description of an embodiment given by way of example, which description is offered in relation to appended drawings which represent.

DETAILED DESCRIPTION

Figure 1:
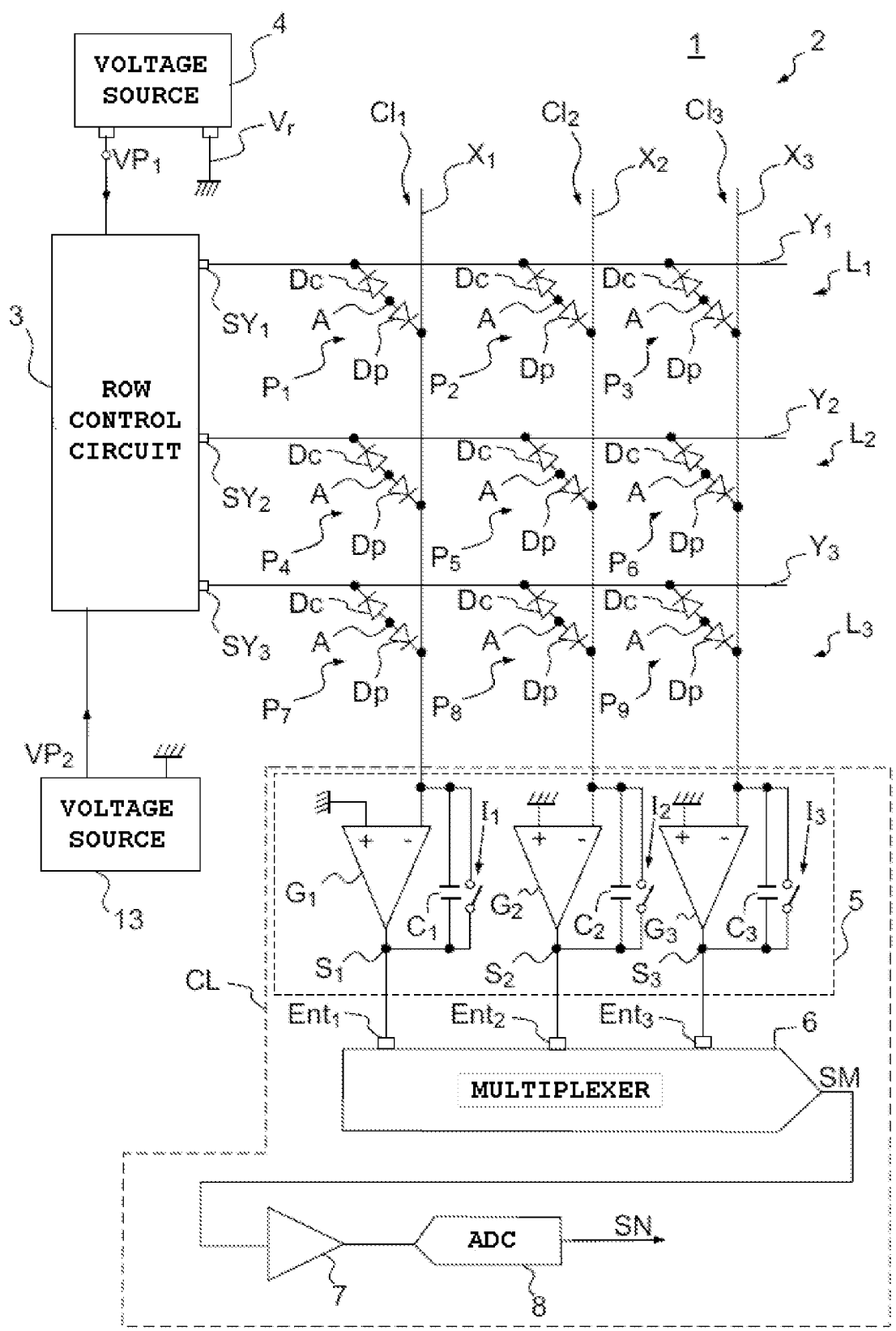
FIG. 1, a first exemplary passive photosensitive device to which the invention can be applied.

FIG. 1 represents a simplified diagram of a photosensitive device 1 comprising a matrix 2 organized in a conventional manner. The matrix 2 comprises photosensitive points $P_1$ to $P_9$, each formed by a photosensitive diode Dp and a switching diode Dc mounted in series according to a head-to-tail configuration. The matrix comprises row conductors $Y_1$ to $Y_3$ crossed with column conductors $X_1$ to $X_3$, with at each crossover, a photosensitive point $P_1$ to $P_9$ connected between a row conductor $Y_1$ to $Y_3$ and a column conductor $X_1$ to $X_3$. The photosensitive points $P_1$ to $P_9$ are thus arranged according to rows $L_1$ to $L_3$ and columns $Cl_1$ to $Cl_3$. They are also called pixels.

In the example of FIG. 1, only three rows and three columns are represented which define nine photosensitive points $P_1$ to $P_9$, but such a matrix can have a much larger capacity, of possibly as much as several million points. It is commonplace for example to produce such matrices having photosensitive points arranged as 3000 rows and 3000 columns (in an area of the order of 40 cm×40 cm), or indeed arranged as a single row and several columns so as to constitute a detection strip, or else arranged as a single row and a single column so as to constitute a single photosensitive point.

The photosensitive device 1 comprises a row control circuit 3, some of whose outputs $SY_1$, $SY_2$ and $SY_3$ are linked respectively to the row conductors $Y_2$ and $Y_3$. The row control circuit 3 has various elements, not represented, such as for example, a clock circuit, switching circuits, and a shift register, which allow it to carry out sequential addressing of the row conductors $Y_1$ to $Y_3$. The photosensitive device 1 furthermore comprises a voltage source 4, delivering to the row control circuit 3 a voltage $VP_1$ serving to define the amplitude of bias pulses applied to the row conductors $Y_1$, $Y_2$ and $Y_3$ and a voltage source 13, delivering to the row control circuit 3, a voltage $VP_2$ serving to define the amplitude of reading pulses applied to the row conductors $Y_1$, $Y_2$ and $Y_3$. These two sources of voltages 4 and 13 can optionally be merged into one.

In each photosensitive point $P_1$ to $P_9$, the two diodes Dp and Dc are linked together either by their anode, as represented in FIG. 1, or by their cathode. The cathode of the photodiode Dp is linked to a column conductor $X_1$ to $X_3$, and the cathode of the switching diode Dc is linked to a row conductor $Y_1$ to $Y_3$.

In the image acquisition or image capture phase, that is to say during the phase of exposure of the matrix 2 to a so-called "useful" luminous signal, the two diodes Dp and Dc of each photosensitive point $P_1$ to $P_9$ are reverse biased. In this state, they each constitute a capacitance. It should be noted that generally the two diodes Dp and Dc are designed so that the capacitance exhibited by the photodiode Dp is the higher, of the order for example of 50 times.

During the acquisition of an image, charge is engendered in the photodiode Dp by the exposure of the photosensitive point $P_1$ to $P_9$ to which it belongs. This charge, the quantity of which is dependent on the exposure intensity, accumulates at a point A on the node formed at the point joining the two diodes Dp and Dc. The reading of the photosensitive points $P_1$ to $P_9$ is performed row by row, simultaneously for all the photosensitive points linked to one and the same row conductor $Y_1$ to $Y_3$. For this purpose, the row control circuit 3 applies a so-called amplitude reading pulse $VP_2$ to each row conductor to $Y_3$ addressed. The row conductors which are not addressed are kept at a reference potential Vr or quiescent potential. This reference potential Vr is for example earth. It may be the same potential as that which is applied to the column conductors $X_1$ to $X_3$.

The possible accumulation of charge at the point A of a photosensitive point $P_1$ to $P_9$ causes a decrease in the voltage at this point, that is to say a decrease in the reverse bias voltage of the photodiode Dp. With certain modes of operation, the effect of applying the reading pulse to a row conductor $Y_1$ to $Y_3$ is to restore to the potential of the point A of all the photosensitive points linked to this row conductor, the bias level that it possessed before exposure to the useful luminous signal. This results in a flow in each of the column conductors $X_1$ to $X_3$ of a current proportional to the charge accumulated at the corresponding point A.

The column conductors $X_1$ to $X_3$ are linked to a reading circuit CL comprising, in the example of FIG. 1, an integrator circuit 5, a multiplexer circuit 6, a video amplifier 7 and an analog-digital converter 8. The integrator circuit 5 comprises as many amplifiers as column conductors $X_1$ to $X_3$ i.e., in the example of FIG. 1, three amplifiers $G_1$ to $G_3$. It furthermore comprises an integration capacitor $C_1$ to $C_3$ and an on/off switch element $I_1$ to $I_3$ for each amplifier $G_1$ to $G_3$. Each column conductor $X_1$ to $X_3$ is linked to a negative input "−" of an amplifier $G_1$ to $G_3$ mounted as an integrator. An integration capacitor $C_1$ to $C_3$ is mounted between the negative input "−" and an output $S_1$ to $S_3$ of each amplifier. The second input "+" of each amplifier $G_1$ to $G_3$ is linked to a potential which, in the example of FIG. 1, is the reference potential Vr. Accordingly, this potential is imposed on all the column conductors $X_1$ to $X_3$. Each amplifier comprises a so-called reset-to-zero on/off switch element $I_1$ to $I_3$ mounted in parallel with each integration capacitor $C_1$ to $C_3$. The on/off switch elements $I_1$ to $I_3$ are for example transistors of the MOS type. The integrator circuit 5 thus transforms the charge flowing on the column conductors $X_1$ to $X_3$ into voltages.

The outputs $S_1$ to $S_3$ of the amplifiers $G_1$ to $G_3$ are linked to inputs $Ent_1$ to $Ent_3$ of the multiplexer circuit 6. The multiplexer circuit 6 is for example formed of a shift register with parallel inputs and series output possibly being of the charge-coupled type, more commonly called C.C.D. from the English expression "Charged-Coupled Device". This conventional arrangement makes it possible to deliver "in series" and row after row (from $L_1$ to $L_3$), at the output of the multiplexer 6, voltages which represent the charge accumulated at the points A of all the photosensitive points $P_1$ to $P_9$. These voltages are called multiplexed signal SM.

The multiplexed signal SM can thereafter be amplified by the video amplifier 7 and converted into a digital signal SN by an analog-digital converter 8.

It should be noted that, in order to fulfill the on/off switch function which, in the example of FIG. 1, is achieved by the switching diode Dc, it is also known to use a transistor. The latter exhibits with respect to the diode a greater complexity of connection, but it offers advantages in the quality of its "on" state.

Figure 2:
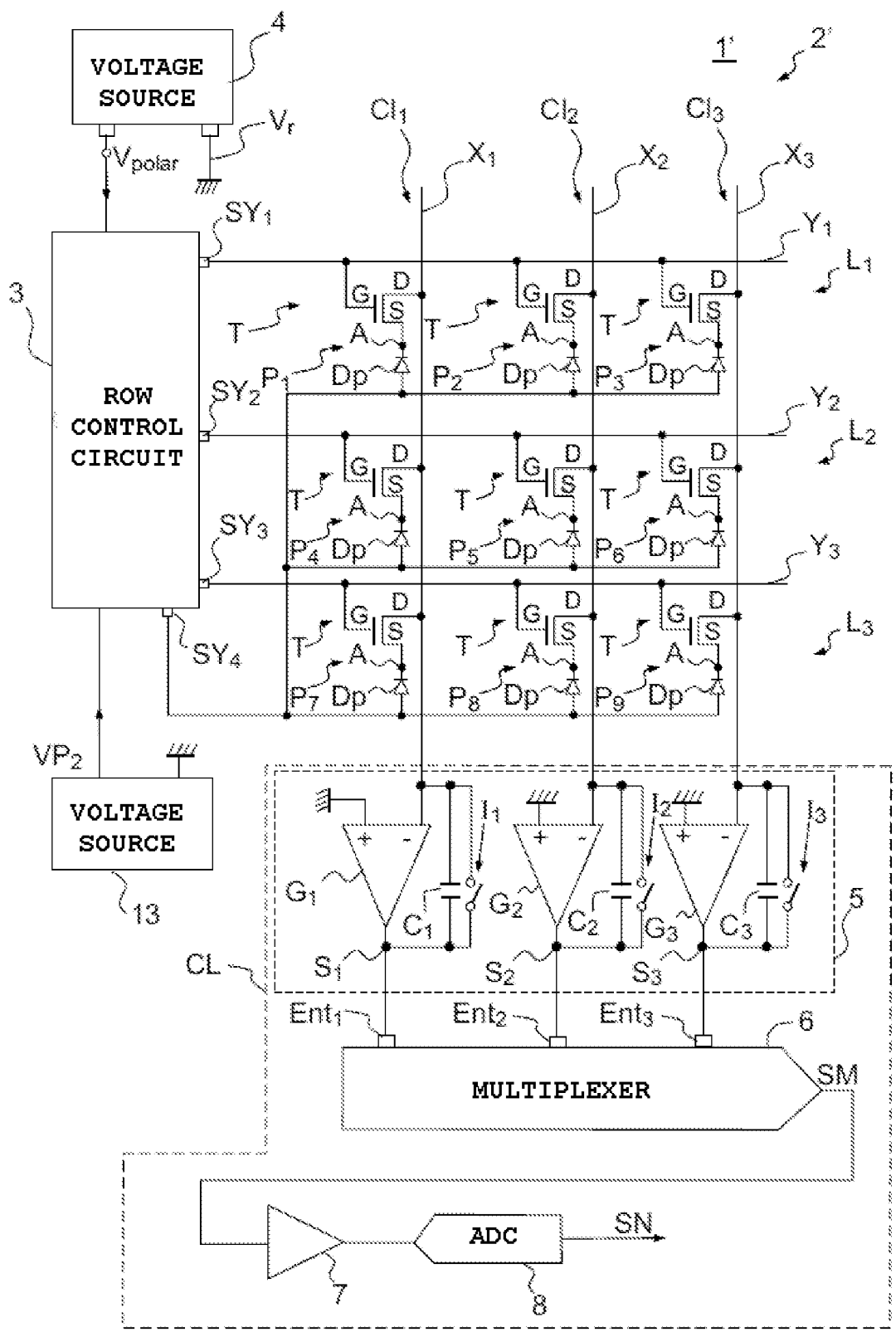
FIG. 2, a second exemplary passive photosensitive device to which the invention can be applied.

FIG. 2 schematically illustrates a photosensitive device 1' which differs from that of FIG. 1 mainly in that it comprises a matrix 2' in which the switching diodes Dc are replaced with transistors T, for example produced by techniques for depositing films in thin layers. Such transistors are known in the English literature by the term "Thin Film Transistor" (TFT). Techniques for depositing films in thin layers can also be used to produce the other elements of the matrices 2 and 2' represented in FIGS. 1 and 2.

In the diagram shown in FIG. 2 by way of example, in each photosensitive point $P_1$ to $P_9$, the transistor T is linked by its source S to the cathode of the photodiode Dp, that is to say to the point A, its gate G is linked to the row conductor $Y_1$ to $Y_3$ to which the photosensitive point belongs, and its drain D is linked to the column conductor $X_1$ to $X_3$ to which the photosensitive point $P_1$ to $P_9$ belongs. The anodes of all the photodiodes Dp are linked to an output $SY_4$ of the row control circuit 3. The output $SY_4$ delivers a so-called bias voltage $V_{polar}$, negative with respect to the reference potential Vr or earth, of the order for example of −5 volts. This bias voltage $V_{polar}$ serves to constitute the reverse bias of the photodiodes Dp. The row control circuit 3 receives for example this bias voltage from the voltage source 4.

For a better understanding of the general operation of the devices represented in FIGS. 1 and 2, reference may be made to the French patent applications published under the Nos. FR 2 760 585 and FR 2 605 166.

FIGS. 1 and 2 describe exemplary embodiments of photosensitive devices 1 and 1' in which the photosensitive points $P_1$ to $P_9$ are termed passive. The invention applies, however, particularly well to photosensitive devices in which the photosensitive points are termed active, that is to say photosensitive points in which the charge accumulated during an image acquisition phase is converted into voltages at the level of the pixels and not outside the matrix in an integrator circuit.

Figure 3:
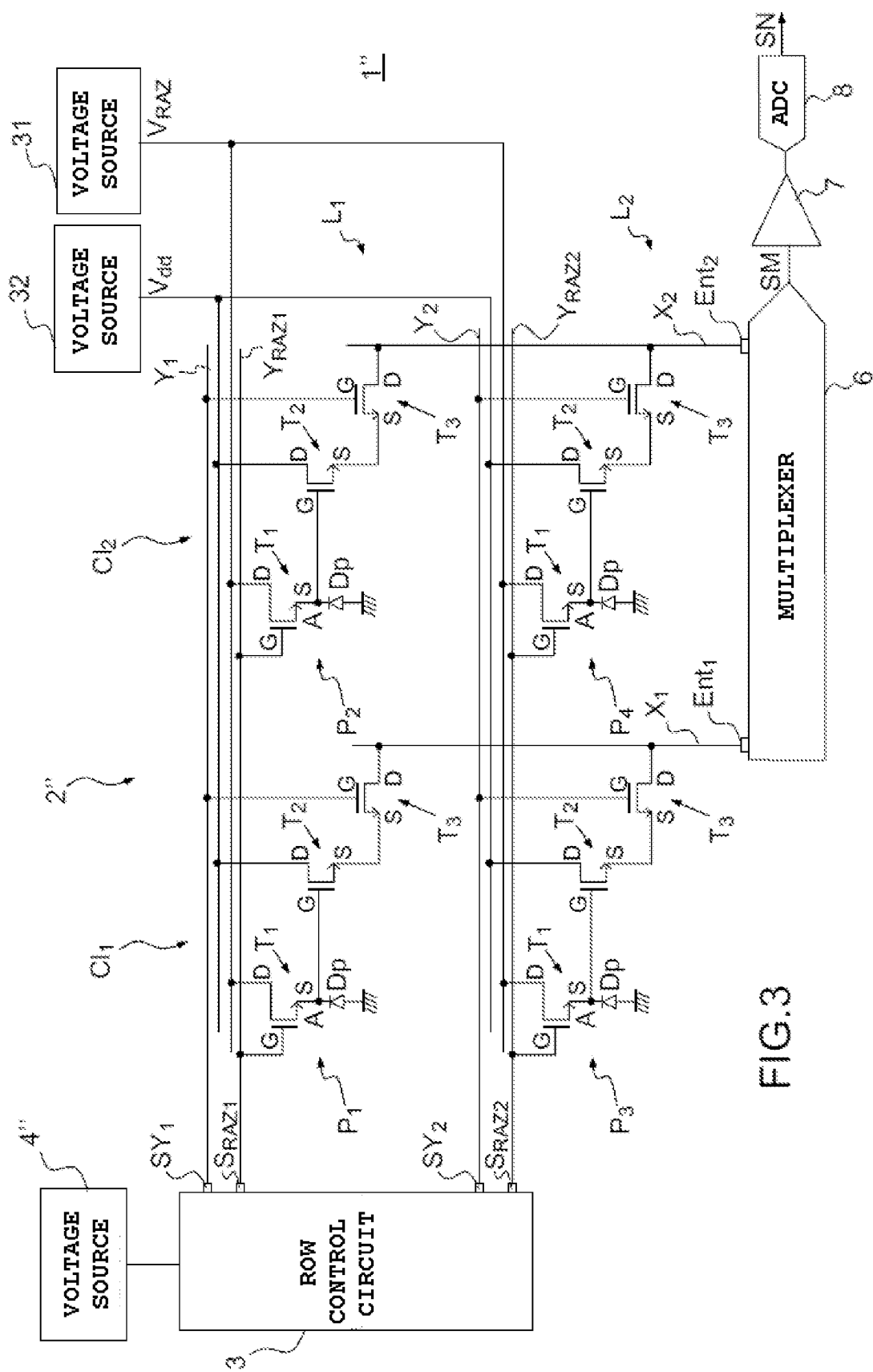
FIG. 3, an exemplary active photosensitive device to which the invention can be applied.

FIG. 3 illustrates such a photosensitive device 1" comprising a matrix 2" of two rows $L_1$ and $L_2$ by two columns $Cl_1$ and $Cl_2$ of photosensitive points $P_1$ to $P_4$. The row control circuit 3 comprises two outputs $SY_1$ and $SY_2$ linked respectively to two row conductors $Y_1$ and $Y_2$. It furthermore comprises two outputs $S_{RAZ1}$ and $S_{RAZ2}$ linked respectively to two reset-to-zero conductors $Y_{RAZ1}$ and $Y_{RAZ2}$. Each photosensitive point $P_1$ to $P_4$ comprises a photodiode Dp and three transistors $T_1$, $T_2$ and $T_3$. The first transistor $T_1$ of each photosensitive point $P_1$ to $P_4$ is linked by its gate G to the reset-to-zero conductor $Y_{RAZ1}$ or $Y_{RAZ2}$ of the row $L_1$ or $L_2$ to which the photosensitive point $P_1$ to $P_4$ considered belongs, by its drain D to a voltage source 31 subjecting the drain D to a reset-to-zero potential $V_{RAZ}$ and by its source S to the cathode of the photodiode Dp belonging to the photosensitive point $P_1$ to $P_4$ considered. The anodes of all the photodiodes Dp are linked to a common potential, for example earth. The same point A may be defined between the source S of the transistor $T_1$ and the cathode of the photodiode Dp. This point A is moreover linked to the gate G of the second transistor $T_2$ of the same photosensitive point $P_1$ to $P_4$. The source S of this transistor $T_2$ is linked to the source S of the third transistor $T_3$ of the same photosensitive point $P_1$ to $P_4$ and the drains D of all the transistors $T_2$ are linked to a voltage source 32 subjecting the drains D to a supply potential $V_{dd}$. The third transistor $T_3$ of each photosensitive point $P_1$ to $P_4$ is moreover linked by its gate G to the row conductor $Y_1$ or $Y_2$ of the row $L_1$ or $L_2$ to which the photosensitive point $P_1$ to $P_4$ considered belongs and by its drain D to the column conductor $X_1$ or $X_2$ of the column $Cl_1$ or $Cl_2$ to which the photosensitive point $P_1$ to $P_4$ considered belongs.

The transistors $T_1$ make it possible to reset the photosensitive points $P_1$ to $P_4$ into their original state, that is to say into the state that they had before being exposed to radiation. More particularly, the transistors $T_1$ make it possible, when a reset-to-zero pulse is dispatched by the row control circuit 3 on a reset-to-zero conductor $Y_{RAZ1}$ or $Y_{RAZ2}$, to return the potential of the point A of all the photosensitive points $P_1$ to $P_4$ of the row $L_1$ or $L_2$ considered to the starting potential, in this instance the reset-to-zero potential $V_{RAZ}$. The reset-to-zero pulses dispatched by the row control circuit 3 are for example provided by a voltage source 4". The transistors $T_2$ make it possible either to isolate the points A from the column conductors $X_1$ and $X_2$ when the transistors $T_3$ are in the off state, or to copy (to within a constant) the values of the voltages at the points A onto the columns $X_1$ and $X_2$ when the transistors $T_3$ are in the on state. The transistors $T_3$ make it possible to select the row $L_1$ or $L_2$ for which it is desired to copy the signals at the points A onto the columns $X_1$ and $X_2$.

The reading of the photosensitive points $P_1$ to $P_4$ is also performed row by row. The row control circuit successively applies a reading pulse to each row conductor $Y_1$ and $Y_2$. The voltages at the point A of the photosensitive points $P_1$ to $P_4$ belonging to the row $L_1$ or $L_2$ which is read are then copied onto the column conductors $X_1$ and $X_2$ by way of the transistors $T_2$. The voltages are copied to within a shift voltage.

In contradistinction to the photosensitive devices 1 and 1' of FIGS. 1 and 2, the photosensitive device 1" does not comprise any integrator circuit, the potential developed by the charge accumulated at the point A being copied at the level of the source S of the transistors $T_2$. The column conductors $X_1$ and $X_2$ are linked directly to the inputs $Ent_1$ and $Ent_2$ of the multiplexer 6. The multiplexer 6 generally comprises an input stage consisting of a sample-and-hold stage. The multiplexer 6 delivers as output a multiplexed signal SM which can also be amplified by a video amplifier 7 and digitized by an analog-digital converter 8 so as to provide a digital signal SN.

FIG. 3 is offered with reference to a photosensitive device 1" comprising solely two rows and two columns of photosensitive points. Of course, the invention applies to matrices of much more significant capacity. Furthermore, each photosensitive point can comprise more than three transistors and the supply voltage $V_{dd}$ and reset-to-zero voltage $V_{RAZ}$ can differ for each photosensitive point. The electronics of the pixel can also be more complex and comprise for example a charge amplifier in place of the transistor $T_2$.

In the photosensitive devices 1, 1' and 1" of FIGS. 1 to 3, it is considered that the charge is accumulated during exposure of the photosensitive points $P_1$ to $P_9$ by photodiodes Dp. However, this charge may be accumulated by any photosensitive element, for example phototransistors.

Figure 4:
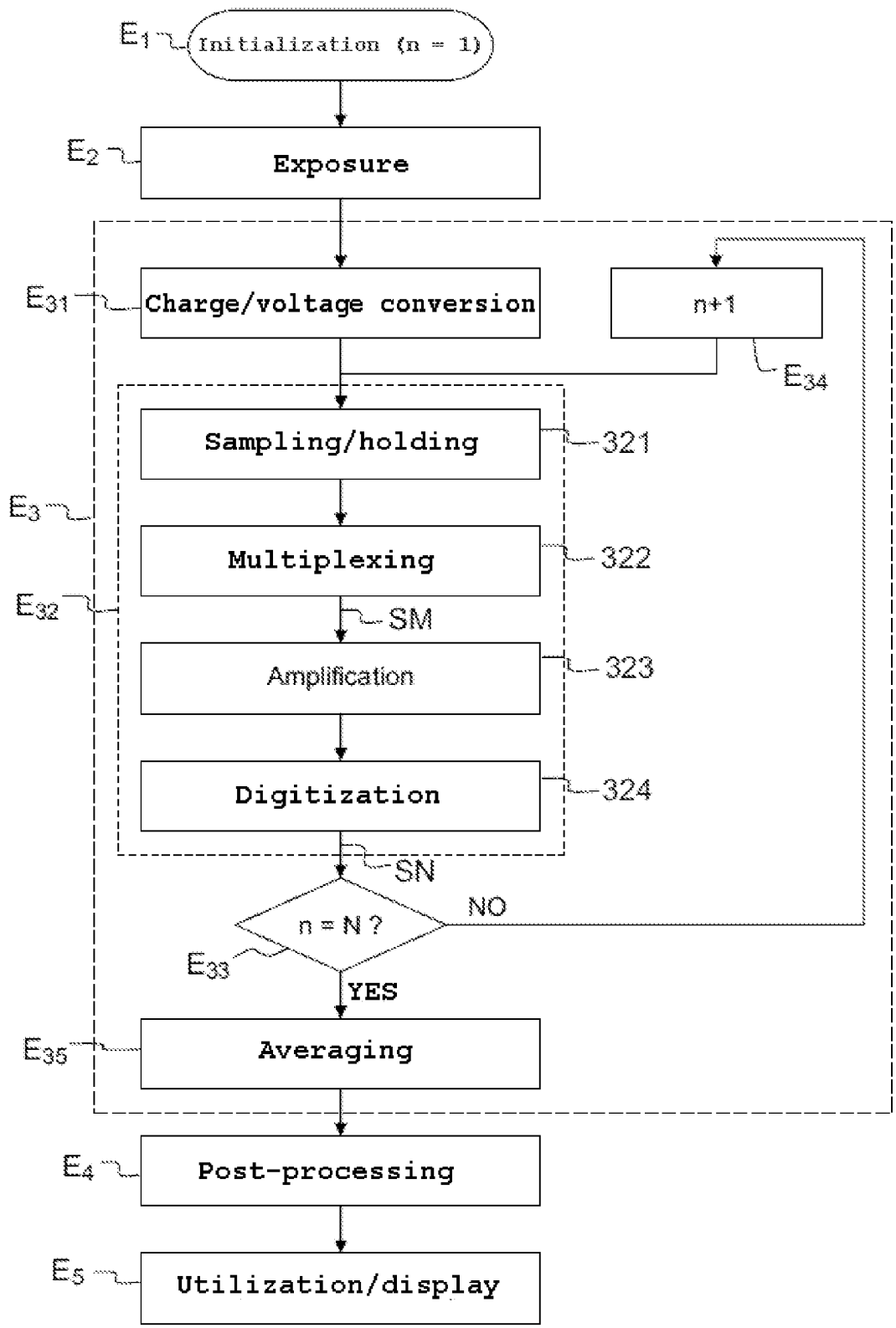
FIG. 4, possible steps for the method according to the invention.
Figure 5:
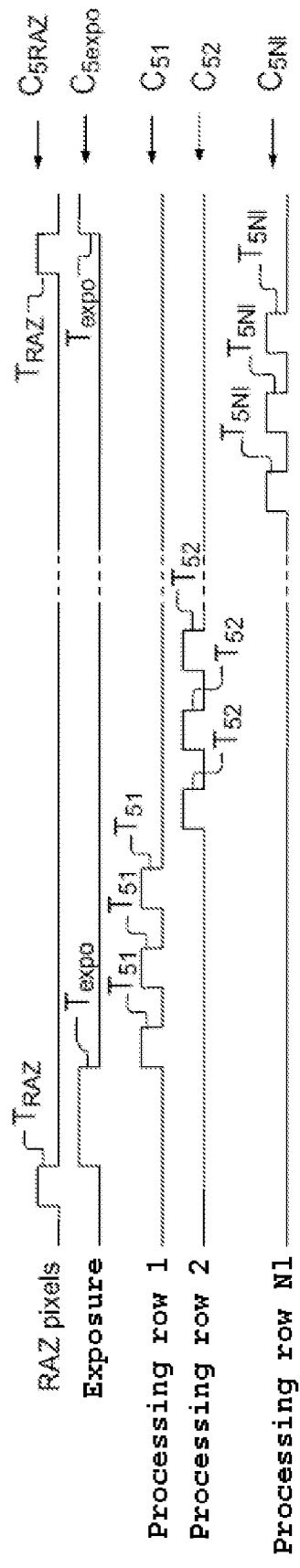
FIGS. 5, 6 and 7, timecharts showing various possibilities for sequencing the processing operations and resets to zero of the signals for the various rows of a matrix of a photosensitive device.
Figure 6:
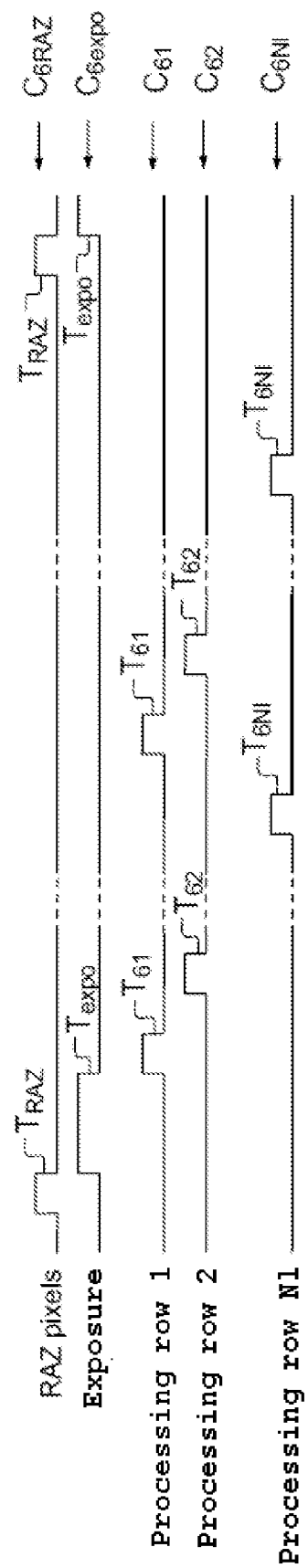

FIG. 4 illustrates possible steps for the method of controlling a photosensitive device such as for example described with reference to FIGS. 1, 2 and 3. The control method according to the invention can comprise a first step $E_1$, termed the initialization step. According to a particular embodiment, adapted to the photosensitive device 1" represented in FIG. 3, the photosensitive points $P_1$ to $P_9$ are reset to zero during this step $E_1$; stated otherwise, they are reset to their original state. This particular embodiment is represented in FIGS. 5 and 6 described hereinbelow. For passive photosensitive devices 1 and 1' such as represented in FIGS. 1 and 2, it is not the photosensitive points $P_1$ to $P_9$ which are reset to zero, but the voltages across the terminals of the integration capacitors $C_1$ to $C_3$ by way of the respective on/off switch elements $I_1$ to $I_3$. The control method comprises a step $E_2$ of acquiring an image in the course of which each photosensitive point $P_1$ to $P_9$ is able to accumulate a charge and a step $E_3$ of reading this image. In the course of step $E_2$, the matrix 2, 2' or 2" is exposed to a useful luminous signal, originating for example from a scintillator receiving X-rays that have passed through a part of the body of a patient of whom it is desired to obtain a radiological image. Generally, the reading of the image is carried out row by row, but it can also be carried out pixel by pixel or simultaneously for all the pixels of the image. Step $E_3$ comprises a prior sub-step $E_{31}$ of converting the charge accumulated at the various photosensitive points of the row considered into analog signals representative of this charge, a sub-step $E_{32}$ of processing these analog signals repeated N times for each photosensitive point $P_1$ to $P_9$ with N an integer greater than or equal to two, each processing sub-step $E_{32}$ making it possible to obtain a row of a distinct digital image, and a sub-step $E_{35}$ of averaging the N signals processed per photosensitive point $P_1$ to $P_9$. The N processed signals are averaged in relation to the photosensitive point $P_1$ to $P_9$ considered so as to provide at the end of the image acquisition chain, a single digital image per acquisition step. The value of N can notably be determined by the user as a function of the exposure time of the photosensitive points $P_1$ to $P_9$ and of the signal-to-noise ratio of the digital image that he desires to obtain. The value of N may be bounded by the time available between two image acquisitions. In a general manner, N is greater than 2, but so as not to slow down the reading rate excessively, N will preferably be chosen between 2 and 10.

Sub-step $E_{31}$ is carried out in the photosensitive devices 1 and 1' represented in FIGS. 1 and 2 by the integrator circuit 5 and, in the photosensitive device 1" represented in FIG. 3, by the transistors $T_2$. The analog signals representative of the charge are then voltages.

Sub-step $E_{32}$ can comprise a multiplexing 322 of the analog signals so as to provide in series, for each processing sub-step $E_{32}$, a multiplexed signal SM. The multiplexing 322 is for example carried out by the multiplexer 6 represented in FIGS. 1 to 3. Advantageously, the multiplexer 6 is preceded in the image acquisition chain by a sample/hold unit, not represented in these figures. The sampling/holding 321 then immediately precedes in the method according to the invention the multiplexing 322. According to a particular embodiment, the processing sub-step $E_{32}$ comprises a digitization 324 of the analog signals, stated otherwise a conversion of the analog signals into digital signals. The analog signals can notably be digitized after the multiplexing 322 by the analog-digital converter 8. Still according to a particular embodiment, sub-step $E_{32}$ comprises an amplification 323 of the analog and/or digital signals. The amplification 323 relates for example to the multiplexed signals SM. It may be carried out by the video amplifier 7. Although the description offered with reference to sub-step $E_{32}$ presents a processing operation where the analog signals are firstly multiplexed, amplified, and then digitized, it must obviously be understood that the multiplexing 322, the amplification 323 and the digitization 324 may occur in a different order. Moreover, other processing operations may be carried out on the analog signals arising from the photosensitive points $P_1$ to $P_9$, such as amplifications and filterings. However, it is particularly advantageous to provide for a repetition of the whole of the part of the image acquisition chain which processes analog signals, including the digitization 324, because noise may be introduced at each stage of the image acquisition chain, in this instance during the sampling/holding 321, the multiplexing 322, the amplification 323 and the digitization 324. It is also possible to provide for a repetition of the whole of the image acquisition chain from the conversion of the charge into analog signals and up to the signals received by a display. The averaging of the signals is then performed as close as possible to the display in a part of the image acquisition chain generally comprising at least one microcontroller or a programmable logic circuit.

According to the invention, the processing sub-step $E_{32}$ is repeated N times after each step $E_2$ of acquiring an image, doing so for each row of photosensitive points. For each step $E_2$, N multiplexed signals SM are therefore obtained per row. According to a particular embodiment, the repetition of sub-step $E_{32}$ is obtained by way of a counter of readings, the value of which is denoted n. According to this particular embodiment, during the initialization step $E_1$, the value n of the counter of readings is set to the value one. On completion of the processing sub-step $E_{32}$, it is possible to determine in a sub-step $E_{33}$ whether the value n of the counter is equal to the value N. If such is not the case, it is possible to increment the value n of the counter by one unit in a sub-step $E_{34}$ and to repeat sub-step $E_{32}$ in its entirety. If the value n of the counter is equal to the value N, the N processed signals obtained for each photosensitive point $P_1$ to $P_9$ are then averaged in a sub-step $E_{35}$. During row-by-row processing, the N processed signals obtained originate from each photosensitive point of one and the same row, for example $P_1$ to $P_3$. Step $E_3$ is repeated for each row (pixels $P_4$ to $P_6$, and then pixels $P_7$ to $P_9$). The averaging is for example an arithmetical or quadratic averaging. It can also be weighted as a function of the value n of the counter of readings or of an amplitude of certain signals. It is also possible to eliminate aberrant values of signals, for example lying outside predetermined brackets. The averaging can notably be performed on the N multiplexed and digitized signals. The signal obtained by the averaging sub-step $E_{35}$ can then be utilized by the remainder of the image acquisition chain in the same manner as if it entailed a signal arising from a single processing sub-step $E_{32}$.

The invention makes it possible to reduce the electronic noise introduced in the sub-step $E_{32}$ of processing the analog signals insofar as the noise is at least partially decorrelated from other noise between two processing operations and is therefore partially cancelled out. More particularly, for completely decorrelated noise, the overall noise for N processing sub-steps $E_{32}$ is divided by the square root of N ($\sqrt{N}$) with respect to the noise which would be introduced for a single sub-step $E_{32}$. Consequently, it is appreciated that for two processing sub-steps $E_{32}$ (N=2), the noise is already reduced by more than 40 percent. For real-time processing, the processing sub-steps $E_{32}$ are not repeated more than a certain number of times so as not to slow down the reading rate. The sub-steps $E_{32}$ are for example repeated from 2 to 10 times for each row of photosensitive points ($2 \leq N \leq 10$).

On completion of the reading step $E_3$, the signal may optionally undergo a post-processing in a step $E_4$ and be utilized and/or displayed in a step $E_5$. The post-processing can for example relate to a gain correction for each photosensitive point $P_1$ to $P_9$. A gain correction (pixel by pixel) is necessary insofar as the evolution of the ratio of the charge accumulated at a photosensitive point $P_1$ to $P_9$ to the integrated voltage for this charge does not correspond to the same linearity coefficient for all the photosensitive points $P_1$ to $P_9$.

According to a particular embodiment, each step $E_2$ of acquiring a useful image, that is to say an image for which the photosensitive points $P_1$ to $P_9$ have been subjected to an exposure, is preceded by a step of acquiring an offset image, that is to say an image for which the photosensitive points $P_1$ to $P_9$ have not been subjected to an exposure, and by a step of reading this offset image. During the post-processing step $E_4$, it is then possible to correct the useful image as a function of the offset image. An offset correction is generally necessary insofar as the semi-conducting components used in the photosensitive devices 1, 1' and 1", in particular the photodiodes Dp, the switching diodes Dc and the transistors $T_1$, $T_2$ and $T_3$, are not all strictly identical. With the useful image encompassing the offset image, the correction of the useful image as a function of the offset image may be performed by pixel-by-pixel subtraction between the useful image and the offset image. In the case where there is no resetting to zero of the charge/voltage conversion stage, the offset correction consists of a correlated double sampling.

Still according to a particular embodiment, the step of reading the offset image is identical to step $E_3$ of reading the useful image. Stated otherwise, the analog signals representative of the charge accumulated in the photosensitive points $P_1$ to $P_9$ in the absence of exposure and called offset signals are processed N times and then averaged pixel by pixel so as to decrease the noise generated by the processing sub-step $E_{32}$ in the same manner as for the useful signals.

According to a particular embodiment, the control method according to the invention comprises several sequencings of the sub-steps $E_{32}$ of processing and $E_{35}$ of averaging, it being possible for the processing sub-steps $E_{32}$ to differ according to the sequencing. By way of example, a first processing sub-step $E_{32}$ can comprise a sampling/holding 321 and a multiplexing 322 of the analog signals and a second sub-step $E_{32}$ can comprise an amplification 323 and a digitization 324 of the multiplexed signal SM, each sub-step $E_{32}$ being repeated N times before the N signals which arise therefrom are respectively averaged in a first and in a second averaging sub-step $E_{35}$.

FIGS. 5 and 6 illustrate, by timecharts, two different possibilities of sequencing the operations of processing the analog signals according to the rows of the matrix 2, 2' or 2". For the subsequent description, matrices of photosensitive points organized as NI rows by Nc columns are considered. In the timecharts, a high state is considered to be an active state and a low state is considered to be a passive state.

FIG. 5 illustrates a first possibility where the processing sub-step $E_{32}$ is repeated N times for one and the same row before considering the next row. More precisely, according to this possibility, a row-by-row averaging of N signals originating from the pixels of one and the same row is performed. Stated otherwise, if a given row of pixels is considered, each reading circuit corresponding to a column (one also speaks of the foot of a column) collects N successive signals originating from the pixel situated in said row. It is known that, during the reading of a pixel, the potential read evolves toward an asymptotic value, the latter corresponding to the charge collected by the pixel. By collecting N successive samples of this potential, by means of the sample-and-hold unit 321, each successively collected sample approaches the asymptotic value. Thus, for each pixel of the row considered, the average of these N samples is more representative of the charge collected in the pixel, this in comparison with the case where the N readings are undertaken only by way of N complete acquisitions (on several rows), these N acquisitions being carried out without resetting the photosensitive points to zero. In this example, N has been chosen equal to three but any other integer value greater than or equal to two is of course possible. A first timechart $C_{5RAZ}$ presents the periods $T_{RAZ}$ of resetting the photosensitive points to zero. In relation to FIG. 3, the timechart $C_{5RAZ}$ illustrates a possible shape of signal for the reset-to-zero conductors $Y_{RAZ1}$ and $Y_{RAZ2}$. A second timechart $C_{5expo}$ presents the period $T_{expo}$ of step $E_2$ of acquiring an image, that is to say the period during which the photosensitive points are subjected to radiation. Three other timecharts $C_{51}$, $C_{52}$ and $C_{5NI}$ respectively represent the periods $T_{51}$, $T_{52}$ and $T_{5NI}$ during which the signals of the first, of the second and of the last row are processed by sub-step $E_{32}$. In relation to FIG. 3, the timecharts $C_{51}$ and $C_{52}$ illustrate the signals that may possibly be applied to the row conductors $Y_1$ and $Y_2$, respectively. The timecharts $C_{5RAZ}$, $C_{5expo}$, $C_{51}$, $C_{52}$ and $C_{5NI}$ show that:

each period $T_{expo}$ is preceded by a period $T_{RAZ}$;
on completion of the period $T_{expo}$, the Nc signals of the first row are processed three times;
after the last processing of the signals of the first row, the Nc signals of the second row are in their turn processed three times;
and so on and so forth until the last row where the corresponding signals are processed three times.

Sub-step $E_{35}$ and steps $E_4$ and $E_5$ can be carried out thereafter. A new step $E_2$ of acquiring an image may be performed as soon as the last iteration of sub-step $E_{32}$ of processing the last row finishes.

Of course, for a passive photosensitive device, the charge of the photosensitive points belonging to the row whose signals will be processed must be converted before the first processing sub-step $E_{32}$, in accordance with the reading step $E_3$ described with reference to FIG. 4.

FIG. 6 illustrates a second possibility of sequencing the operations of processing the analog signals where the processing sub-step $E_{32}$ considers each row in succession before being repeated. In this example, N has been chosen equal to two. In FIG. 6, the timecharts $C_{6RAZ}$ of resetting the photosensitive points to zero and $C_{6expo}$ of exposing the photosensitive points are respectively identical to the timecharts $C_{5RAZ}$ and $C_{5expo}$. Three other timecharts $C_{61}$, $C_{62}$ and $C_{6NI}$ respectively represent the periods $T_{61}$, $T_{62}$ and $T_{6NI}$ during which the signals of the first, of the second and of the last row are processed by sub-step $E_{32}$. In contradistinction to the timecharts of FIG. 5, the timecharts $C_{6RAZ}$, $C_{6expo}$, $C_{61}$, $C_{62}$ and $C_{6NI}$ show that, on completion of the exposure period $T_{expo}$, the Nc signals of the first row are processed a first time, followed by the Nc signals of the second row, and so on and so forth until the last row where the corresponding signals are also processed a first time. The first row, the second row and the following rows are thereafter processed a second time, up to the last row. After the N iterations of sub-step $E_{32}$ of processing the last row, the averaging steps $E_{35}$, and then the post-processing step $E_4$ and the utilization and/or display step $E_5$ may be carried out. A new step $E_2$ of acquiring an image can also be performed.

According to a particular embodiment, represented in FIGS. 5 and 6, the analog signals representative of the charge of all the photosensitive points are reset to zero after the N repetitions for each photosensitive point of the processing sub-step $E_{32}$. Consequently, by considering two successive useful images, the resetting to zero of the analog signals according to the N repetitions of sub-step $E_{32}$ for obtaining the first image corresponds to the resetting to zero preceding step $E_2$ of acquiring the next image.

Figure 7:
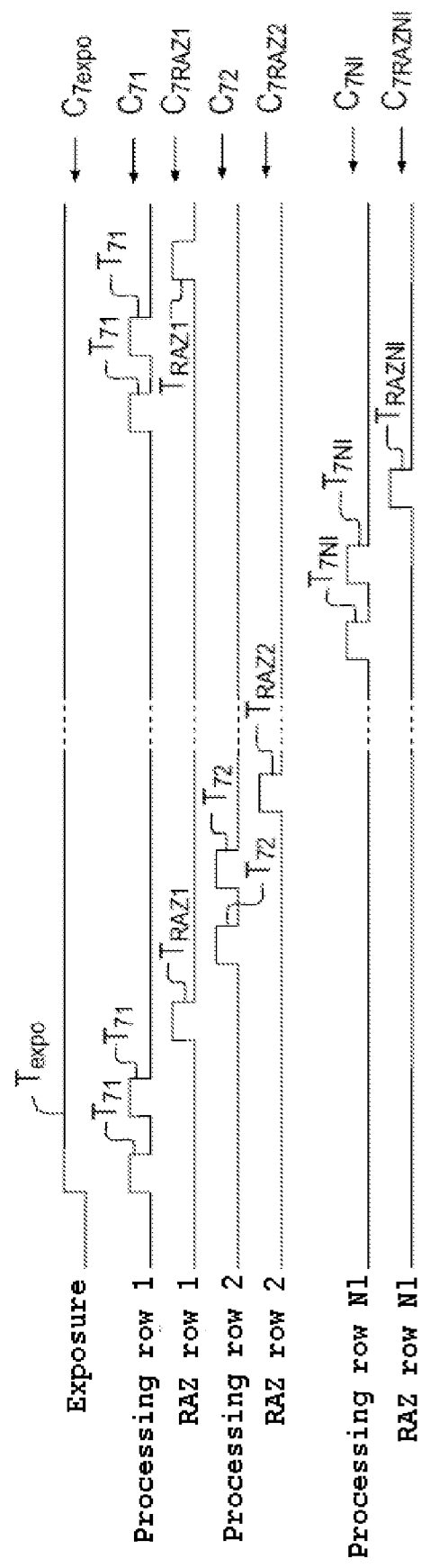

FIG. 7 illustrates, by timecharts, another particular embodiment of the method according to the invention with N equal to two. A first timechart $C_{7expo}$ presents the period $T_{expo}$ of step $E_2$ of acquiring an image. Three timecharts $C_{71}$, $C_{72}$ and $C_{7NI}$ respectively represent the periods $T_{71}$, $T_{72}$ and $T_{7NI}$ during which the signals of the first, of the second and of the last row are processed by sub-step $E_{32}$. Three other timecharts $C_{7RAZ1}$, $C_{7RAZ2}$ and $C_{7RAZNI}$ illustrate the periods $T_{RAZ1}$, $T_{RAZ2}$ and $T_{RAZNI}$ during which the analog signals of the first, of the second and of the last row are respectively reset to zero. According to this particular embodiment, the analog signals representative of the charge of all the photosensitive points of the row considered are reset to zero before considering the next row. This embodiment is particularly adapted to a continuous exposure period $T_{expo}$ or, at the very least, to one which is greater than the overall duration of processing of the signals arising from all the photosensitive points. In FIG. 7, it is considered that the step $E_2$ of exposing the photosensitive points is performed in parallel with the reading step $E_3$. The sequencing of the operations of processing the signals is performed in accordance with the possibility described with reference to FIG. 5, that is to say the processing sub-step $E_{32}$ is repeated N times for one and the same row before considering the next row. On the other hand, after the N sub-steps $E_{32}$ of processing the signals of the first row, these signals are reset to zero during a period $T_{RAZ1}$. The signals of the second row are thereafter processed N times before being reset to zero during a period $T_{RAZ2}$, and so on and so forth for all the rows of the matrix 2, 2' or 2", until the last row where the corresponding signals are processed N times before being reset to zero during a period $T_{RAZNI}$. Then, steps $E_{35}$, $E_4$ and $E_5$ are carried out. Thereafter, a new image can thus be acquired by a new reading step $E_3$ where the signals of the various rows are processed in succession.

The invention makes it possible to reduce the noise generated by the image acquisition chain in a simple and economical manner, no hardware modification of the image acquisition chain being necessary. The number N of processing operations performed per photosensitive point can easily be adapted as a function of the desired signal-to-noise ratio and of the hardware resources of the image acquisition chain.

The invention claimed is:

1. A method of controlling a photosensitive device comprising a matrix of photosensitive points organized in rows and columns, the method comprising:
   acquiring an image in the course of which each photosensitive point is able to accumulate a charge and reading said image, the reading step comprising:
   a prior sub-step of converting the charge accumulated at the various photosensitive points into analog signals representative of this charge; and
   a sub-step of processing these analog signals making it possible to obtain a digital image,
   wherein the processing sub-step further comprises a multiplexing of the analog signals so as to provide in series a multiplexed signal for each processing sub-step, and
   wherein the processing sub-step is repeated N times for a single exposure, for each photosensitive point and for each acquisition step, with N an integer greater than or equal to two, and
   wherein the reading step comprises a sub-step of averaging the N signals processed per photosensitive point so as to provide a single digital image per acquisition step.

2. The method as claimed in claim 1, wherein the analog signals are voltages.

3. The method as claimed in claim 1, wherein the processing sub-step comprises a conversion of the analog signals into digital signals.

4. The method as claimed in claim 1, wherein the processing sub-step comprises a sampling/holding of the analog signals immediately preceding their multiplexing.

5. The method as claimed in claim 1, wherein the processing sub-step comprises an amplification of the analog signals or, if appropriate, of the digital signals.

6. The method as claimed in claim 1, wherein each step of acquiring an image for which the photosensitive points are subjected to an exposure, being a useful image, is preceded by a step of acquiring an image for which the photosensitive points are not subjected to an exposure, being a offset image, and by a step of reading this offset image, the step of reading the offset image being identical to the step of reading the useful image, the useful image being corrected as a function of the offset image.

7. The method as claimed in claim 1, wherein the processing sub-step is repeated N times for each row before considering the next row.

8. The method as claimed in claim 1, wherein the processing sub-step considers each row in succession before being repeated.

9. The method as claimed in claim 1, wherein the analog signals representative of the charge of all the photosensitive points are reset to zero after the N repetitions for each photosensitive point of the processing sub-step.

10. The method as claimed in claim 7, wherein the analog signals representative of the charge of all the photosensitive points of the row considered are reset to zero before considering the next row.

* * * * *